(12) United States Patent
Magarill (10) Patent No.: US 6,332,688 B1
(45) Date of Patent: *Dec. 25, 2001

(54) APPARATUS FOR UNIFORMLY ILLUMINATING A LIGHT VALVE

(75) Inventor: Simon Magarill, Cincinnati, OH (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/441,267

(22) Filed: May 15, 1995

Related U.S. Application Data (62) Division of application No. 08/267,125, filed on Jun. 28, 1994, now Pat. No. 5,625,738.

(51) Int. Cl.$^7$ .............................. G02B 5/10; G02B 5/08; G02B 17/00; G02B 21/00
(52) U.S. Cl. .................... 359/858; 359/850; 359/856; 359/364; 359/365; 359/869; 359/726; 359/727; 362/297; 362/298; 362/302
(58) Field of Search .................... 359/850, 853, 359/856, 858, 726, 727, 728, 729, 730, 731, 364, 365, 366, 869; 362/297, 298, 302

(56) References Cited

U.S. PATENT DOCUMENTS

| | | | |
|---|---|---|---|
| 3,893,754 | * | 7/1975 | McInally ........................ 359/858 |
| 4,050,775 | * | 9/1977 | Scholten ........................ 359/728 |
| 4,422,135 | * | 12/1983 | McCamy ........................ 362/346 |
| 5,127,729 | * | 7/1992 | Oetliker et al. ................ 356/317 |
| 5,142,387 | * | 8/1992 | Shikama et al. ............... 362/298 |
| 5,272,570 | * | 12/1993 | Yoshida et al. ................ 359/850 |
| 5,390,265 | * | 2/1995 | Jiao ............................... 385/15 |
| 5,430,634 | * | 7/1995 | Baker et al. ................... 359/858 |
| 5,477,394 | * | 12/1995 | Shibazaki ...................... 359/858 |

FOREIGN PATENT DOCUMENTS

| | | | | |
|---|---|---|---|---|
| 0501294 | * | 7/1930 | (DE) ........................ 359/365 |
| 405040223 | * | 2/1993 | (JP) ........................ 359/727 |
| 405045587 | * | 2/1993 | (JP) ........................ 359/850 |
| 406130301 | * | 5/1994 | (JP) ........................ 359/853 |

* cited by examiner

Primary Examiner—Paul M. Dzierzynski
Assistant Examiner—Mohammad Y. Sikder
(74) Attorney, Agent, or Firm—William J. Chervenak (57) ABSTRACT

A light energy efficient and low cost optical system for providing uniform illumination of a light valve. The light source is an extended source generally emitting a non-uniform spatial distribution of light power. The source light is focused into the entrance end of a light transmitting tunnel having reflecting interior wall surfaces and having cross sectional and length dimensions chosen to deliver, at the exit end of the tunnel, light which is substantially uniform is power distribution, over the surface area of the exit end, due multiple reflections from the tunnel walls. The exiting light is advantageously used to uniformly illuminate a light valve. The invention includes a combination of mirrors arranged about the source light to most effectively collect and direct the light.

3 Claims, 9 Drawing Sheets

FIG. 4a
Comparative Example

APPARATUS FOR UNIFORMLY ILLUMINATING A LIGHT VALVE

This is a division of application Ser. No. 08/267,125, filed Jun. 28, 1994 now U.S. Pat. No. 5,625,738.

BACKGROUND OF THE INVENTION

The invention relates to optical apparatus for uniformizing light from a light source and delivering the light to a light valve. In particular, the inventive apparatus makes use of an optical system, including a light transmitting tunnel, to receive non-homogeneous light from an extended light source and deliver uniform illumination onto a light valve.

Recently, considerable interest has arisen in applying liquid crystal display technology as well as the technology of deformable mirror devices to implementation of projection systems. Such applications usually require a uniform illumination of the light valve, viz., the liquid crystal display or the deformable mirror device, in order to provide a uniform, stable projection image. In most applications, the projection system design specification includes space limitations, viz., the distance between the light source and the light valve. The light valve and its illumination system must fit into a restricted space. For light valves which are sensitive to infrared or ultraviolet light, such as the liquid crystal or deformable mirror device, the space restriction leads to a requirement for efficient removal ot these wavelengths from the light beam.

Thus, a need exists for a compact light valve illumination system which provides for uniformity of light across the active area of the valve. Furthermore, there is a need for a light valve illumination system which makes efficient use of light power and which provides a means for directing infrared and ultraviolet light away from the valve. In addition, low cost and light weight are required for the projection system to be commercially competitive.

A light transmitting tunnel is described in U.S. Pat. No. 3,170,980, Pritchard. However, in this patent the tunnel specifications are rigorous to an extent that the tunnel could not readily be incorporated into a light valve illumination system. ". . . manufacturers of high precision optical equipment state that the glass used in making the optical tunnel should have no dimension ratios greater than roughly 5:1." (Col.2, II. 19–22) "This limitation means that the weight of the optical tunnel increases enormously as its length increases." (Col.2, II. 26–28).

In U.S. Pat. No. 5,059,013, Jain, there is a system described relating to, ". . . method and apparatus for providing a light beam of selected cross section shape and uniform intensity, and which emits self luminously into a selected numerical aperture." (Col. 1, II. 11–14) However, the system is complicated and expensive in that it makes use of a polygon aperture, a light expanding and trimming sub-system, a laser, a second light source and a number of other components as set forth in the method section. (Col.4, I. 48 to Col.5, I. 32.).

SUMMARY OF THE INVENTION

The present invention meets the need for a simple, low cost light uniformizing or homogenizing transmission system which is cost effective, can efficiently operate using light from sources having a wide variety of sizes and shapes and can function properly within the spatial restrictions usually associated with projection or display systems.

A first aspect of the invention is an apparatus for uniformly illuminating a light valve. Light from a light source is focused into a light tunnel. In one embodiment of the invention the light tunnel is shaped as a right parallelepiped. The focusing means may be one or more lenses or mirrors. For example, the source may be located at one focus of a truncated ellipsoid mirror. An additional mirror, in the shape of an annulus taken from the surface of a sphere, may be positioned adjacent the opening in the truncated ellipsoid. The concave surface of the annulus reflects light back into the ellipsoid mirror, thereby capturing additional light from the source for delivery into the tunnel. The focus of the spherical segment is coincident with the one focus of the ellipsoidal mirror.

A preferred mirror system includes a first annular paraboloid mirror positioned in edge to edge contact with the ellipsoidal mirror, the reflective surface of the paraboloid mirror forming a continuation of the reflective surface of the ellipsoid. The focus of the paraboloid annulus coincides with the one ellipsoidal focus. A second annular paraboloid mirror, having its reflective surface facing the reflective ellipsoid surface and having its focus coincident with the first paraboloid focus, is positioned in edge to edge contact with the first paraboloid mirror annulus. The final mirror element is the spherical element formed as described above and positioned in space apart and symetrical relation to the second annular paraboloid mirror. The annular openings in the paraboloid and spherical mirrors is chosen to permit passage of the cone of light reflected from the ellipsoidal mirror to the target.

The spot of light focused on the plane of the tunnel entrance is generally circular in shape, having a diameter D. The spot may have a more general shape, e.g., an ellipse or an area with irregular boundaries. In these latter cases, D is the maximum linear dimension of the spot in the plane of the tunnel entrance. The maximum angle between a line perpendicular to the tunnel cross section and any light ray of the spot is u. The angle u is the angular aperture of the focusing means. The light tunnel has walls, which form a rectangular cross section, a length L and a smaller inside dimension N. The relationship between N, D, L and u is given by the equation, $$L = k^* N / \tan(u),$$

where k is a constant in the range of about 1.5 to 3. This relationship essentially provides for multiple reflections of the input light from the walls of the tunnel. The multiple reflections serve to uniformize the transmitted beam across the tunnel exit end. A light valve is positioned at the exit end of the tunnel to receive the light emerging from the tunnel. The maximum angle of any light ray exiting the tunnel, where the angle is defined analogously to angle u, is generally less than or equal to angle u.

An embodiment of the invention further comprises an exit optical system, located between the tunnel exit and the light valve, which produces an image of the tunnel exit light on the light valve. The exit optical system may be one or more lenses to magnify or reduce the image of the tunnel exit so that the image essentially coincides with the entire active area of the light valve. The active area of a light valve is the area of the valve which is capable of varying, in a controllable way, the direction or intensity of light incident thereon or passing therethrough. This exit optical system is designed to have an aperture capable of collecting essentially all light exiting the tunnel. That is, the entrance angular aperture of the exit optical system is greater than or equal to u.

The light tunnel may be a hollow tube having an interior surface which reflects light from the source. The tube cross section shape in general matches the shape of the active area of the light valve. For a rectangular light valve, the tunnel is a right parallelepiped having a cross sectional aspect ratio essentially equal to the aspect ratio of the active area of the light valve.

In another aspect of the invention, the tunnel may be filled with a material transparent to light from the source. Total internal reflection of the light within the transparent material occurs because the refractive index of the fill material is higher than the refractive index of the material immediately adjacent the sides of the fill material and because the maximum angle between the fill material wall and essentially any ray in the light traversing the tunnel fill material is less than or equal to the critical angle for total internal reflection. The fill material may be any of a number glass or plastic compositions such as BK 7 glass, available from Bourns Optical Glass, Inc. or acrylic plastic, e.g., V825 from Rohm & HAAS Co., Inc.

In yet another aspect of the invention, the walls of the tunnel are uniformly tapered so that the cross section changes uniformly from entrance end to exit end of the tunnel. FIG. 2 shows the uniform taper of a rectangular tunnel. The uniform taper is characterized in that angle 18 of FIG. 2 defines the taper of each side. In one embodiment of the invention, the walls taper from smaller dimension at the entrance end to larger dimension at the exit end. The taper in this embodiment causes the angular aperture at the exit end to be smaller than the angular aperture at the entrance end of the tunnel.

In a further aspect of the invention, the apparatus for uniformly illuminating a light valve comprises a light source, a hollow light transmitting tunnel having a rectangular cross section and the interior surface of the walls reflective of light from the light source. The quantities L, N and u, defined above, are related by the equation, $$L = k*N/\tan(u),$$

where k is a constant in the range of about 1.5 to 3. The aspect ratio of the exit end of the rectangular tunnel, M/N, is essentially equal to the aspect ratio of the rectangular active area of the light valve, P/Q, which receives light from the exit end of the tunnel.

In a further embodiment of the apparatus, the apparatus includes one or more lenses, located between the tunnel exit and the light valve, to image the light from the exit end of the tunnel onto the active area of the light valve. To obtain maximum efficiency of light use, the image essentially exactly covers the active area of the valve and the entrance angular aperture of the one or more lenses, the angle u, is greater than or equal to the angular aperture of the tunnel exit.

In yet another aspect of the inventive apparatus, a light spot of maximum dimension D is directed into the entrance end of a first light transmitting tunnel having a rectangular cross section. The entrance end of the tunnel has a smaller dimension N and $D \leq N$. The angular aperture of the light spot is the angle u as above. A second segment is fixedly joined to the first segment so that the included angle between the two segments is substantially 90°. The joint between segments excludes external light. A right angle prism is positioned at the juncture of the two segments to direct light from the exit of the first segment into the entrance of the second segment. The angular aperture of the light exiting the second segment is essentially equal to the angle u.

In a preferred embodiment, the first segment of the tunnel has a first sub-segment which begins at the first segment entrance and extends along a portion of the first segment length. The first sub-segment is tapered such that the entrance cross section is smaller than the exit cross section of the sub-section. The first sub-section is fixedly joined to the second sub-section which is not tapered and makes up the remainder of the segment. This embodiment provides, at the exit end of the first tunnel segment, an angular aperture less than the angular aperture at the entrance end of this first tunnel segment.

In another embodiment of the illuminating system, the light transmitting tunnel has two segments. The second segment is subdivided and has a first tapered sub-segment which begins at the entrance end of the second segment and extends along a portion of the length of the second segment. The second sub-segment, which makes up the remainder of the second segment, is not tapered and is fixedly joined to the first sub-segment.

In yet another embodiment of the illuminating system, the light transmitting tunnel, having two segments, comprises a first and a second segment each of which is subdivided, as above, wherein the first sub-segment of each segment is tapered.

It will be understood that the number of embodiments of the inventive tunnel is essentially infinite because the length, taper angle and location of one or more tapered sections may be varied. Given a particular entrance angular aperture of light entering the transmitting tunnel, one or more tapered sections may be chosen and located to provide a specific exit angular aperture.

Another aspect of the invention is an optical system for uniformly illuminating a light valve comprising, a light source, a light transmitting tunnel have interior reflective walls and a rectangular cross section and a light valve positioned to receive light from the exit end of the tunnel, wherein the aspect ratio of the tunnel cross section is essentially equal to the aspect ratio of the light valve and wherein the light power transmission factor of the tunnel is greater than about 85% and the integration factor of the exiting light is greater than or equal to about 85%.

The transmission factor is defined as,

Transmission Factor=$(I/I_o)*100\%$, where $I_o$ is the total light power entering the tunnel and I is the total light power exiting the tunnel.

The integration factor is defined as,

Integration Factor=$(I_s/I_c)*100\%$, where $I_c$ is the light power measured for a unit area at the center of the tunnel exit and $I_s$ is the minimum light power measured for a unit area at any corner of the tunnel exit.

Yet a further aspect of the invention is an optical system for uniformly illuminating a light valve comprising, a light source, a compound light transmitting tunnel and respective light valves positioned to receive light from each exit of the compound tunnel. The compound tunnel comprises a plurality of segments, each having an entrance end, an exit end, a rectangular cross section and reflective interior walls.

The segments are fixedly joined by a plurality of joint members, each joint member having an entrance end, two exit ends and light filtering and directing means fixedly positioned within the joint member. The filtering and directing means divides a range of light wavelengths incident thereon into a first sub-range of wavelengths reflected from the filter and a second sub-range of wavelengths transmitted through the filter. The reflected wavelength range is directed toward the first exit end of the joint. The transmitted wavelength range is directed toward the second exit end of the joint.

A first tunnel segment is fixedly positioned to receive light from the light source. The exit end of the first segment is fixedly joined to the entrance end of a first joint member. Respective second and third tunnel segments are fixedly joined to respective exit ends of the joint to receive the first and second sub-range of wavelengths.

The respective second and third tunnel segments are fixedly joined to respective second and third joint members which again subdivide the wavelength range incident thereon.

Respective fourth and fifth tunnel segments are fixedly joined to the respective exit ends of the second joint member. A sixth tunnel segment is fixedly joined to one of the exits of the third joint member.

A light valve is positioned at the ends of the fourth, fifth and sixth tunnel segments, respectively.

In a preferred embodiment the first tunnel segment is tapered, as described above, so that the entrance end of the tapered segment is smaller than the exit end of the tapered segment.

In this preferred embodiment, the tapered segment causes the angular aperture of the source light at the entrance end of the first tunnel segment to be greater than the angular aperture at the exit ends of the fourth, fifth and sixth segments, respectively.

Other features and advantages of the invention will become apparent from the detailed description and the following drawings.

BRIEF DESCRIPTION OF THE DRAWINGS

FIG. A—A is a section through the tunnel of FIG. 1 showing the light spot dimensions relative to the inside dimensions of the tunnel.

FIG. B—B is a section through the tapered tunnel showing the smaller entrance end uniformly tapering to the larger exit end.

FIG. 6b is a perspective view of the compound tunnel of FIG. 6a.

FIGS. 7b, 7d and 7e are a set of three dimensional graphs of light energy distribution at the entrance end and exit end of the tunnel of FIG. 7a.

DETAILED DESCRIPTION

The drawings are intended to aid in the description of the inventive apparatus. They are not necessarily drawn to scale.

Figure 1:
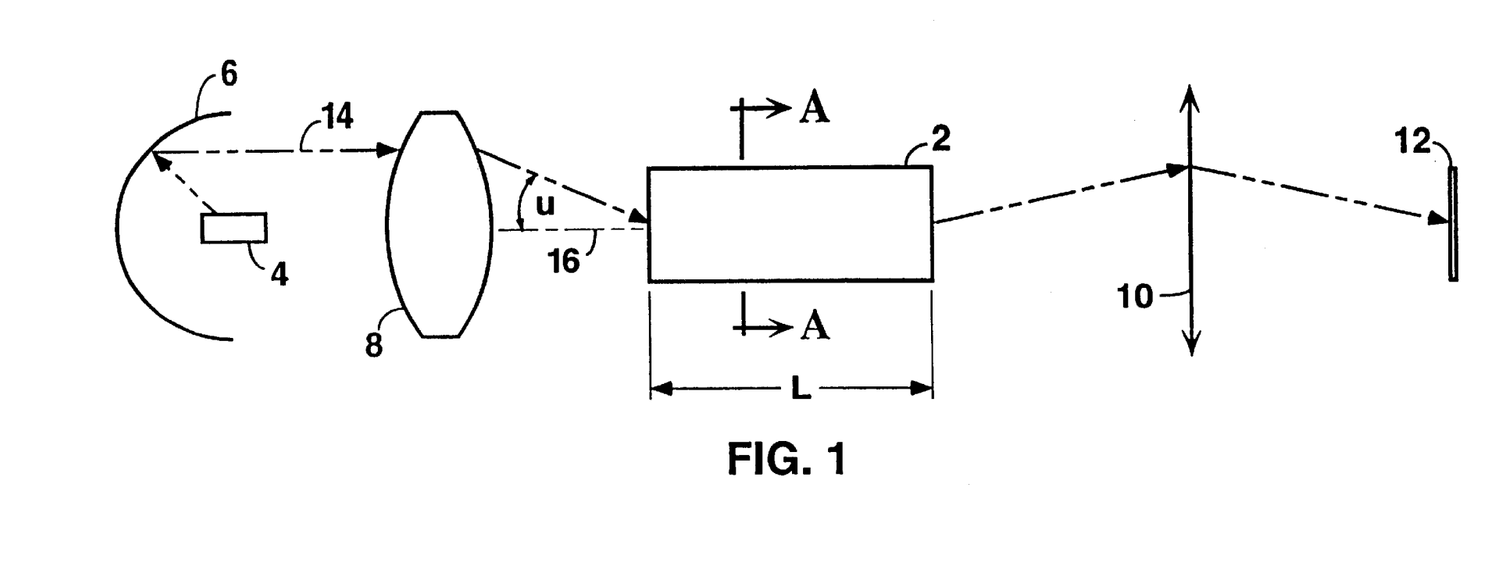
FIG. 1 is a side view schematic illustration of the invention showing the light source, light transmitting tunnel, and, at the tunnel exit, focusing means and a light valve.

The illustration of FIG. 1 shows light tunnel 2 receiving light from source 4 having focusing mirror 6 and lens 8 disposed to collect light from source 4 and deliver the light in to the entrance end of the tunnel. The focusing means could in general comprise any of a number of lens or mirror combinations known in the art. Alternative means of collecting source light for delivery to the light tunnel is shown as mirrors 22 in FIG. 3 or the assembly of FIG. 9.

Figure 9:
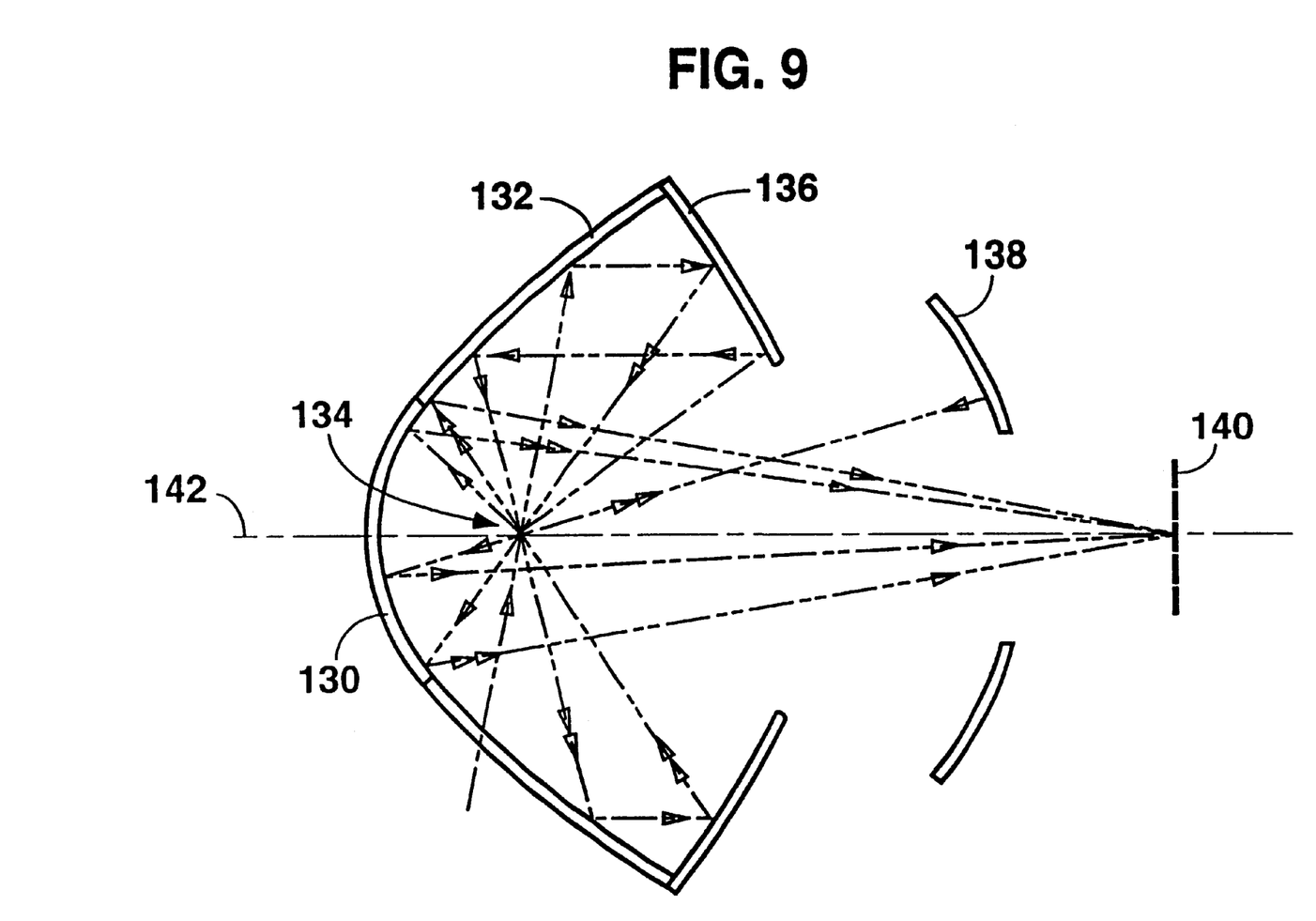
FIG. 9 is a side view of a mirror assembly for collecting and focusing source light.

FIG. 9 shows a preferred mirror assembly for collecting and focusing source light. In FIG. 9, ellipsoidal mirror 130 is centered on optical axis 142 and has one focus located at the light source center point 134. Note that mirror 130 is shown as a segment of an ellipsoid. Ellipsoidal mirror 130 is truncated at the circle which is the locus of points where mirror 130 is joined to mirror 132. The plane which contains this circle is the plane of the truncation. An annular paraboloid segment 132 is joined to mirror 130 and forms a continuation of the reflecting surface of the ellipsoidal mirror 130. Paraboloid mirror annulus 136 is joined to mirror 132 and has a reflecting surface facing mirror 130. Spherical mirror annulus 138 is spaced apart from mirror 136 and overlaps the opening of mirror 136. Mirrors 130, 132 and 136 have coincident focal points 134. Mirror 138 has its center of curvature at point 134. The size of the annular openings is chosen to allow passage of light reflected from ellipsoidal mirror 130 to pass to the target 140. This mirror configuration captures essentially all of the source light and directs it onto the target, which may be the entrance opening of a light tunnel. The efficiency of the mirror assembly, defined as the ratio of light energy at the target to source light energy, is about 95%. Current single reflectors, schematically shown as 6 in FIG. 1, have an efficiency of about 50% or less.

The angle u is defined by the intersection of light ray 14 with the line 16. Line 16 which is perpendicular to the plane of the light tunnel entrance and centered thereon is referred to in the art as the optical axis of the tunnel. Ray 14 represents the ray which makes the maximum angle u with line 16, the optical axis. The angle u is the angular aperture of the focusing means, i.e., the angular aperture of the light spot entering the light tunnel. Light tunnel 2 has length L and a rectangular cross section. Tunnel 2 may be hollow with interior reflecting walls or the space defined by the walls may be filled with a material transparent to source light wherein total internal reflection occurs. In either embodiment, light is transmitted from the entrance to the exit end of tunnel 2. FIG. A—A shows the entrance end of the tunnel having smaller dimension N. The light spot is shown as a circle of diameter D. To maximize efficiency of the system, the size and spacing of the focusing means and the tunnel size are chosen such that D≦N. Light exiting the tunnel is shown passing through relay means 10, which may be one or more lenses, and onto light valve 12. To provide for maximum efficiency of light transmission, the angular aperture of relay 10 is chosen greater than or equal to the angular aperture of light from the tunnel exit so that essentially all the exiting light is relayed to valve 12.

In general, for the light valve to function properly, the illumination of the active area of the valve must be substantially uniform. For example, if the valve is a liquid crystal display or a deformable mirror device for use in a projection system, the quality of image reproduction, i.e., the contrast and clarity, improves as uniformity of illumination improves. The typical requirements for uniformity of illumination on the screen is greater than or equal to 50%. Uniformity is defined similarly to the integration factor above. It is found that uniform illumination of the valve occurs for a choice of angular aperture u, tunnel length L and tunnel dimension N which satisfy the relation, L=$k$*N/tan (u), where k is a constant which lies in the range 1.5 to 3.

By means of reflections of the light rays propagating from the entrance to the exit end of the tunnel, the tunnel effectively transforms a light spot of general shape and power distribution into a light spot of rectangular shape and substantially uniform power distribution.

Relay means 10 is not required if the respective areas of the tunnel exit and the light valve substantially coincide and the light valve is positioned at the exit end of the tunnel to receive uniform illumination. However, size constraints on the inventive apparatus can result in a light spot of angular aperture such that a light collecting relay, viz., at least one lens, is required. Also, these same constraints can result in a light spot which must be changed in size, for example magnified, to fully illuminate the active area of the valve as shown in example 1 below.

Figure 2A:
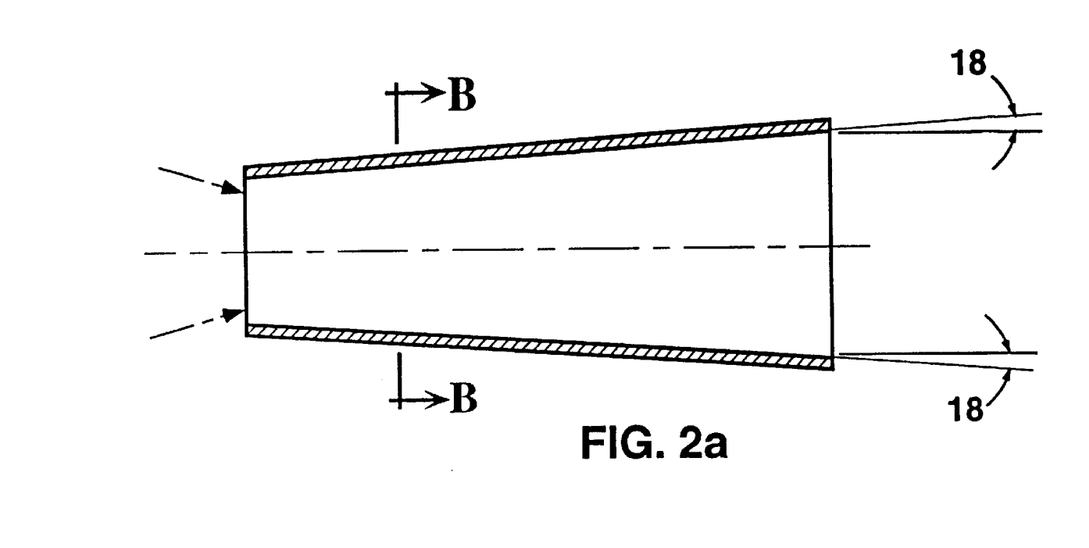
FIG. 2a is a cut away side view of a tapered tunnel.

The inventive apparatus can be tapered as shown in FIG. 2a. When the taper is as shown in FIG. 2a and in the section of FIG. B—B, the entrance angular aperture of the tunnel is greater than the exit angular aperture of the tunnel. Hence, the combination of a tapered segment into the inventive tunnel advantageously allows the use of a smaller relay means or even obviates the need for a relay means between the tunnel exit and the light valve. This inventive combination can therefore result in a further reduction in required space as well as a reduction in system cost.

Figure 2B:
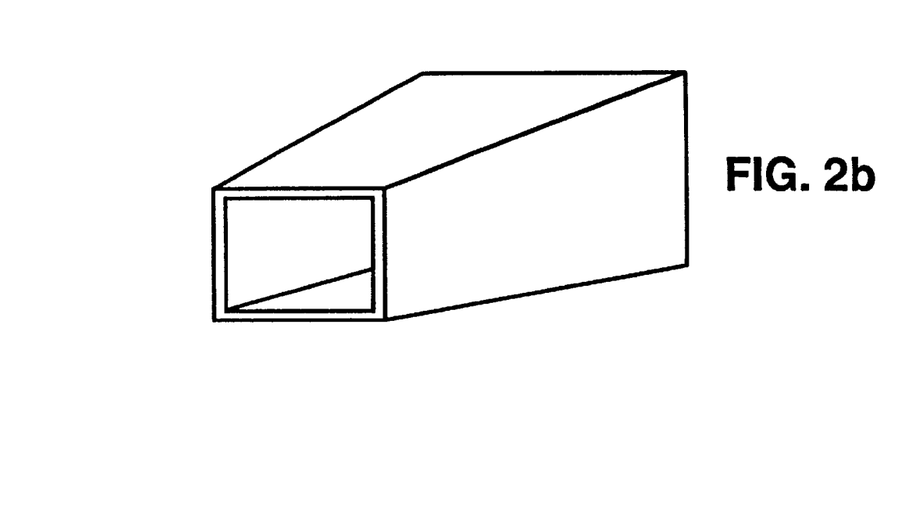
FIG. 2b is a perspective view of a tapered tunnel.

In a uniformly tapered tunnel segment, each wall is characterized by the angles 18 shown in FIG. 2a. Angle 18 is the angle between the plane of the wall and a line perpendicular to the plane of the entrance end of the tunnel. The size of angle 18 is chosen to yield the exit angular aperture appropriate to a particular valve size or relay means. The section shown in FIG. B—B and the perspective drawing in FIG. 2b show the uniform taper of each of the tunnel walls.

Figures 3, 4A, 4B:
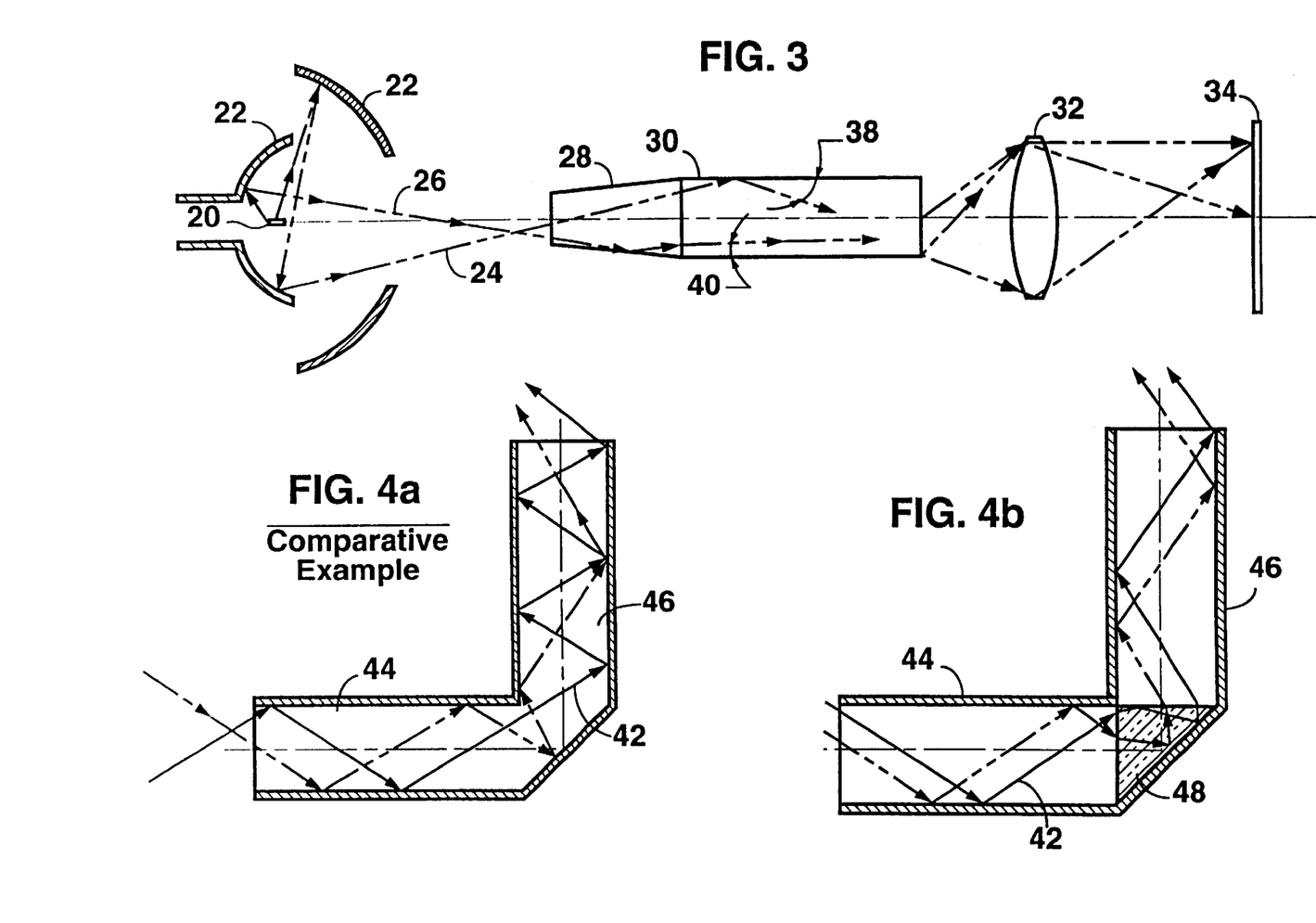
FIG. 3 is a cut away side view of the tapered tunnel in combination with a light source, light source focusing means, a light valve, and means for imaging the exiting light upon the light valve.
FIG. 4a is a cut away top view of a two segment light transmitting tunnel showing a mirror at the junction of the segments for directing light from one segment into the other.
FIG. 4b is a cut away top view of a two segment light transmitting tunnel showing a right angle prism at the junction of the segments for directing light from one segment into the other.

FIG. 3 shows an embodiment of the invention wherein a tapered tunnel segment is joined to a straight tunnel segment. Light from source 20, which typically could be a carbon arc, is directed by mirror system 22 into the entrance of tapered segment 28. To optimize light use efficiency, the size of the opening in the annular mirror of mirror system 22 and the shape of the mirrors are generally chosen to produce a light spot with a maximum dimension, in the plane of the tunnel entrance, less than the smaller tunnel dimension. Light ray 26 enters the tunnel and is reflected from a surface of the tapered tunnel segment. Light ray 24 is first reflected from the interior surface of the straight portion of the tunnel. In this case, rays 24 and 26 form equal angles with a line perpendicular to the plane of the tunnel entrance. Angle 40 is advantageously less than angle 38. Stated differently, light ray 26 leaves the tunnel at a smaller angle than light ray 38. The length of the tapered segment is chosen so that the higher angle light rays entering the tunnel are first reflected from the tapered segment, so that the exit angular aperture is smaller than the entrance angular aperture. Hence, light relay means 32 is able to collect and image more of the exiting light onto light valve 34. Alternatively, relay means 32 could be chosen to be thinner or smaller in effective surface area thereby providing improved efficiency in delivering light to the valve. A cost savings is realized from using a smaller relay and less light is lost to absorption because the relay, in this case one or more lenses, is thinner.

In a preferred embodiment, the tunnel has two segments joined in a generally right angle configuration as shown in FIGS. 4a and 4b. This embodiment provides at least two improvements over a straight tunnel:
 i) the folded tunnel takes up less linear space and still delivers uniform illumination to the valve;
 ii) infrared and ultraviolet radiation can be filtered at the joint and directed out of the tunnel, thereby preventing damage to any part of the transmission system or to the valve which may be caused by these radiation wavelengths.

The preferred means for directing light from segment 44 into segment 46 is a right angle prism as shown in FIG. 4b. The prism serves to maintain the exit angular aperture equal to the entrance angular aperture, whereas, the mirror configuration of FIG. 4a can result in exit light rays having a high angle which will not be collected for illumination of the valve. In FIG. 4a, ray 42 reflects from a wall in segment 44 directly onto a wall in segment 46, thereby producing a high angle exit light ray. However, ray 42 in FIG. 4b, having an angle greater than the critical angle inside the prism, undergoes total internal reflection inside the prism and then enters segment 46 at essentially the same angle relative to the wall as in segment 44. A filter, such as a dichroic coating, may be located at the diagonal prism surface 48 to allow transmission of infrared light, i.e., heat, and ultraviolet light out of the tunnel. It will be understood, that either segment 44 or segment 46 may be tapered if a lower exit angular aperture is required.

Figure 5A:
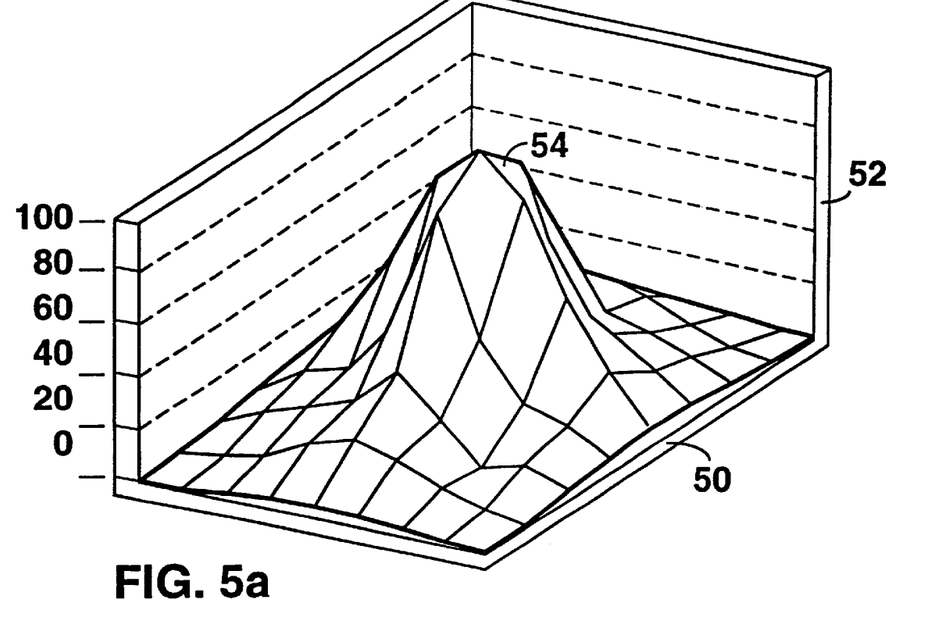
FIG. 5a is a three dimensional illustration of the light power distribution at the entrance end of a light transmitting tunnel.
Figure 5B:
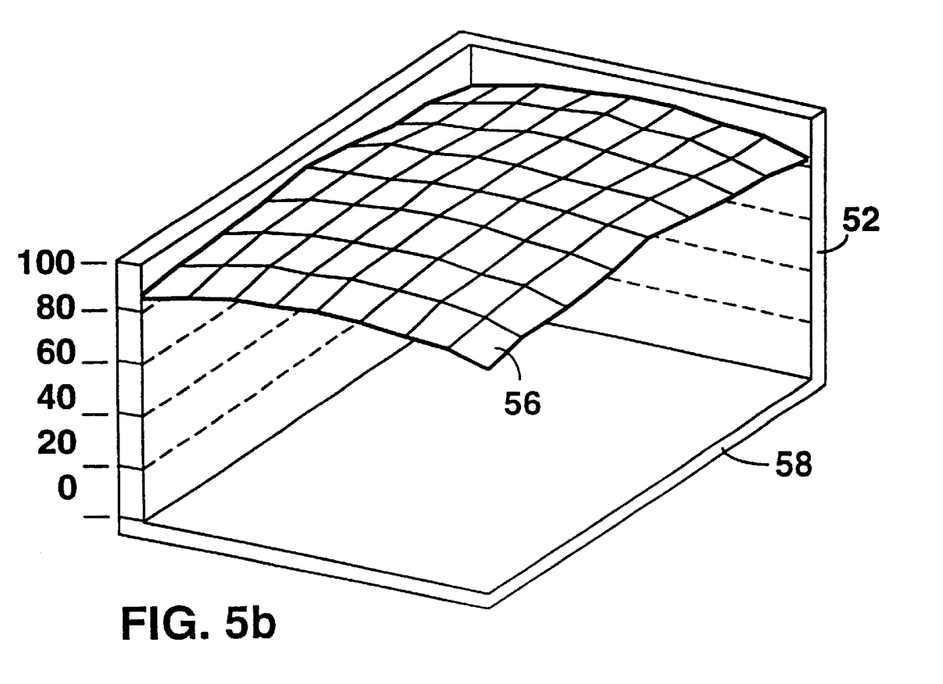
FIG. 5b is a three dimensional illustration of the light power distribution at the exit end of a light transmitting tunnel.

A typical light power distribution, delivered into the entrance end of the inventive tunnel by the focusing means disposed about the source, is shown in FIG. 5a. The bottom plane 50 of FIG. 5a corresponds to the plane defined by the entrance end of the tunnel. The light power is measured in arbitrary units on the vertical walls 52 of FIGS. 5a and 5b. Upon entry into the tunnel, the light power is localized at the tunnel center, as shown by surface 54 in FIG. 5a. Surface 58 in FIG. 5b corresponds to the plane defined by the exit end of the tunnel. After traversing the inventive tunnel, the light power has become substantially uniform across the tunnel exit as shown by surface 56. The integration factor, defined above, is essentially 0% for the distribution in FIG. 5a. The integration factor for the distribution of FIG. 5b is about 90%. For reference, an integration factor of 100% corresponds to essentially perfect uniformity. For a typical application an integration factor of 50% or greater is acceptable.

Figure 6A:
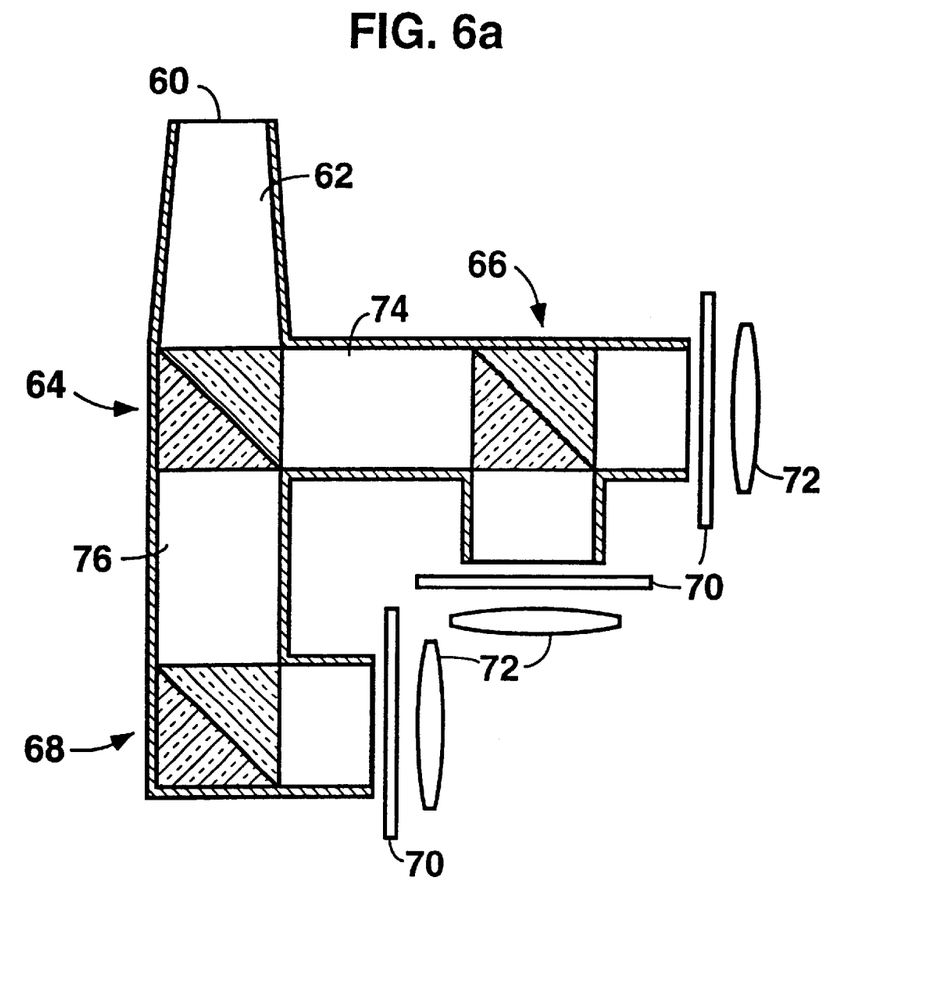
FIG. 6a is a cut away top view of a compound light tunnel showing, at the junction of the tunnel segments, means for dividing the incident light wavelength range and for directing light in a first and a second direction, light valves at the tunnel exits, and means for focusing light passing through the valve.

The embodiment shown in FIG. 6a illustrates the key features of the invention:
 i) uniformity of light power across the plane of the tunnel exit;
 ii) efficient transmission of light power by apparatus located in a limited space;

iii) limitation of exit aperture to an angle less than or equal to the entrance aperture; and, iv) provision for dissipation of infrared and ultraviolet light.

Light enters the compound tunnel at entrance end 60. Segment 62 is tapered is ensure that the exit angular aperture at each exit is less than the entrance angular aperture. Directing and filtering means 64, 66, and 68 are advantageously located at the respective ends of segments 62, 74, and 76. Directing and filtering means 64 reflects light having a wavelength in a selected range into segment 74 and transmits light having a wavelength in another selected range into segment 76. The preferred directing and filtering means comprises a prism having a dichroic coating on its diagonal surface, selected to correspond to the desired transmission and reflection ranges of light wavelength, on the inside diagonal face of the prism.

Directing and filtering means 66 and 68 further subdivide the range of wavelengths incident thereon, transmitting a sub-range of wavelengths and reflecting another sub-range of wavelengths. Thus each of the light valves 70 receives a specific and distinct range of wavelengths. The compound light transmitting tunnel could thus be advantageously used in an application wherein the intensity of each of the three primary colors was modulated by a light valve. For example, the dichroic coatings on the interior diagonal surfaces of elements 64, 66 and 68 may be chosen so that element 64 reflects green and blue into segment 74 and transmits red and the remaining light spectrum of the beam into segment 76. In like manner, element 66 may transmit green and reflect blue and element 68 may reflect red and transmit infrared and ultraviolet. Thereafter, the three highly uniform beams of light, one for each primary color, could be superimposed upon a surface area, producing thereon a colored image. Optical elements 72. denoted field lenses in the art, are shown in FIG. 6a to indicate that the light beams exiting the light valves may be focused and directed onto a surface such as the entrance pupil of a projection lens.

Filtering and directing means 64 and 68 can be constructed to transmit infrared and ultraviolet, thereby removing from the illuminating system radiation which may damage or otherwise interfere with the operation of system components. As an alternative, a double prism arrangement, such as 101 in FIG. 7c, could be placed at the entrance end of the tunnel to eliminate infrared and ultraviolet from light entering the tunnel.

Figure 6B:
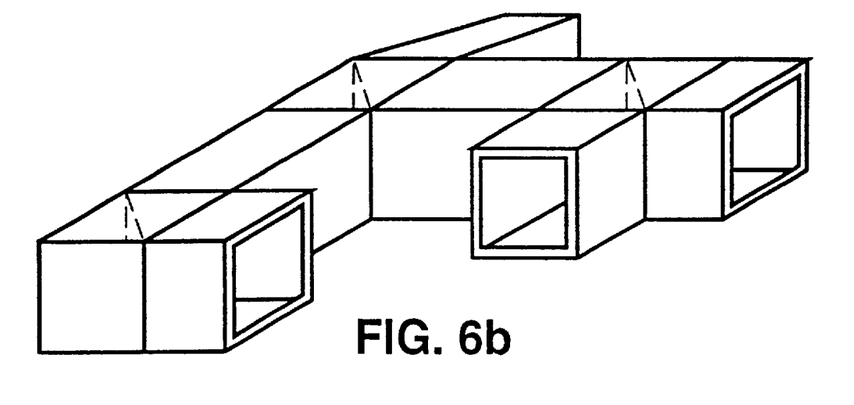

FIG. 6b gives a perspective view of the compound tunnel having three exits.

EXAMPLE 1
A Straight Tunnel LCD Illumination System

Figure 7A:
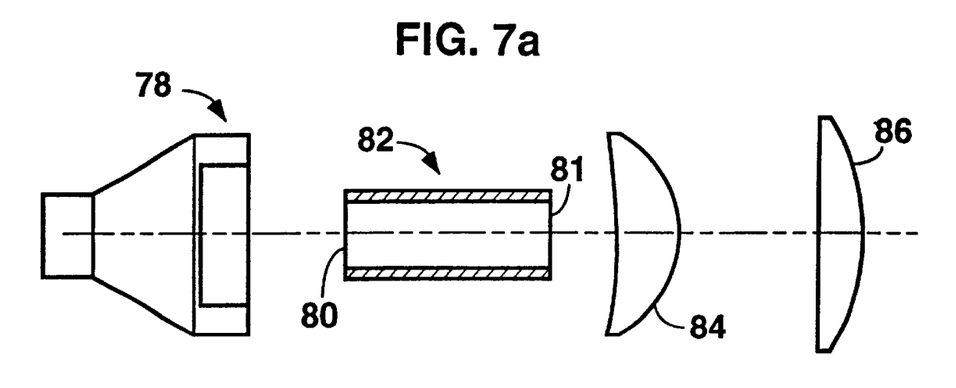
FIG. 7a is a side view of an illumination system which includes the inventive tunnel, a light source and lenses at the tunnel exit.

An optical system for uniform illumination of an LCD panel, having dimensions 144×192 mm, is constructed as shown in FIG. 7A. The system source 78 is a metal halide short arc OSRAM, HTI 400W/24, and can be found in the OSRAM catalogue. The elliptical reflector of the source produces a round spot of light of diameter about 20 mm in plane 80, the entrance plane of light tunnel 82. The distance from the lamp front plane to plane 80 is 24 mm. The tunnel is a right parallelepiped with dimensions 14.8 mm×19.73 mm×60 mm. The tunnel is an aluminum housing having glass sheets cemented to the interior surfaces using a high temperature epoxy inside. The exposed glass surfaces are silvered and have a reflection factor of about 0.96. The silvered surfaces have a thin, about 0.0855 mm, protective overcoat of $SiO_2$ to retard oxidation and to increase reflectivity.

The light power focused into the tunnel is 16000 lumens and the angular aperture is ±36 degrees. The integration factor at the tunnel entrance window is 7.1%. The light power exiting the tunnel is 14250 lumens, giving a tunnel transmission factor of 89%. Note that with u=36 degrees, the smaller tunnel cross section dimension N=14.8 mm, and the length L=60 mm the equation, L=k*N/tan (u), yields k=2.95, which is in the specified range 1.5 to 3.0. A shorter tunnel would produce a k value less than 2.95 and the integration factor at the exit end would be smaller. However the transmission factor would be higher for the shorter tunnel.

The light exiting the tunnel is collected by a two element lens relay, 84 and 86 in FIG. 7A, and directed onto a LCD panel (not shown). Lens 84 is made of FD6 glass and has a front radius −289.5004 mm, a back radius −39.7541 mm, a thickness on center of 18.5 mm and a circular aperture of 62.1 mm. Lens 86 is FD6 glass and has a plane front surface, back radius −82.0509 mm, thickness 12.8 mm and circular aperture 74.2 mm. The distance from the tunnel exit window 81 to the vertex of the first optical surface of the relay 84 is 17.84 mm. The distance from the last optical surface of the relay to the LCD panel is 489.9 mm.

The system serves to transfer essentially all energy from the tunnel exit onto the active area of the LCD panel.

Figure 7B:
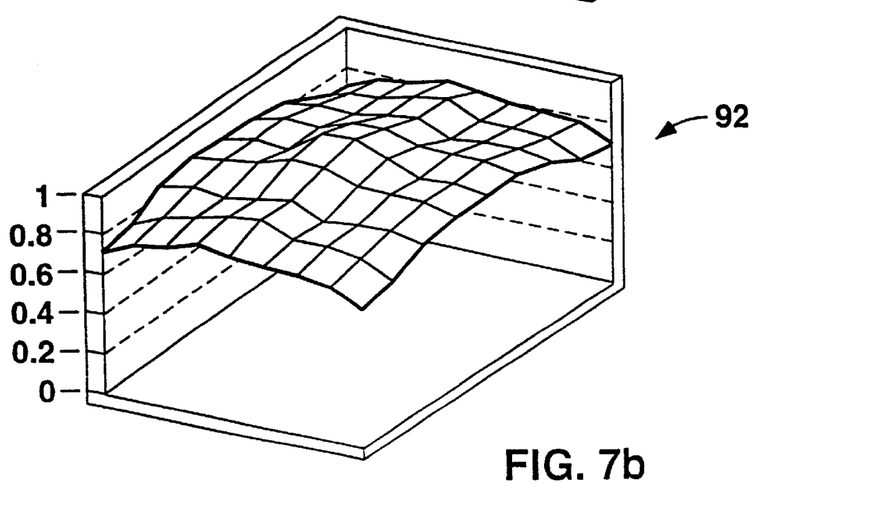
Figure 7C:
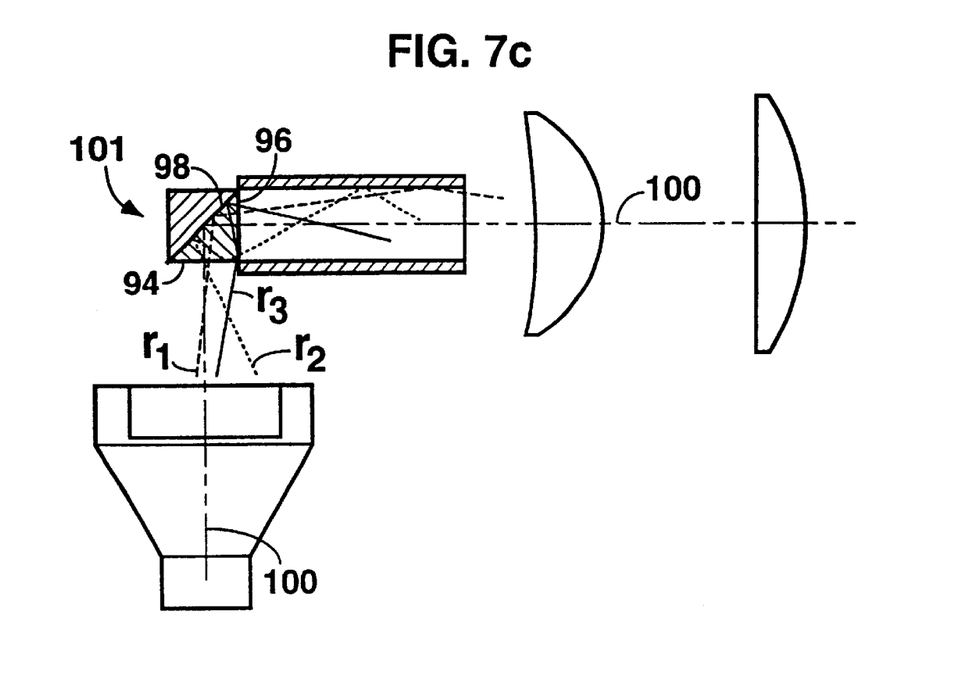
FIG. 7c is a side view of an illumination similar to FIG. 7a but including a prism to fold the light path and to collect light from the source.
Figures 7D, 7E:
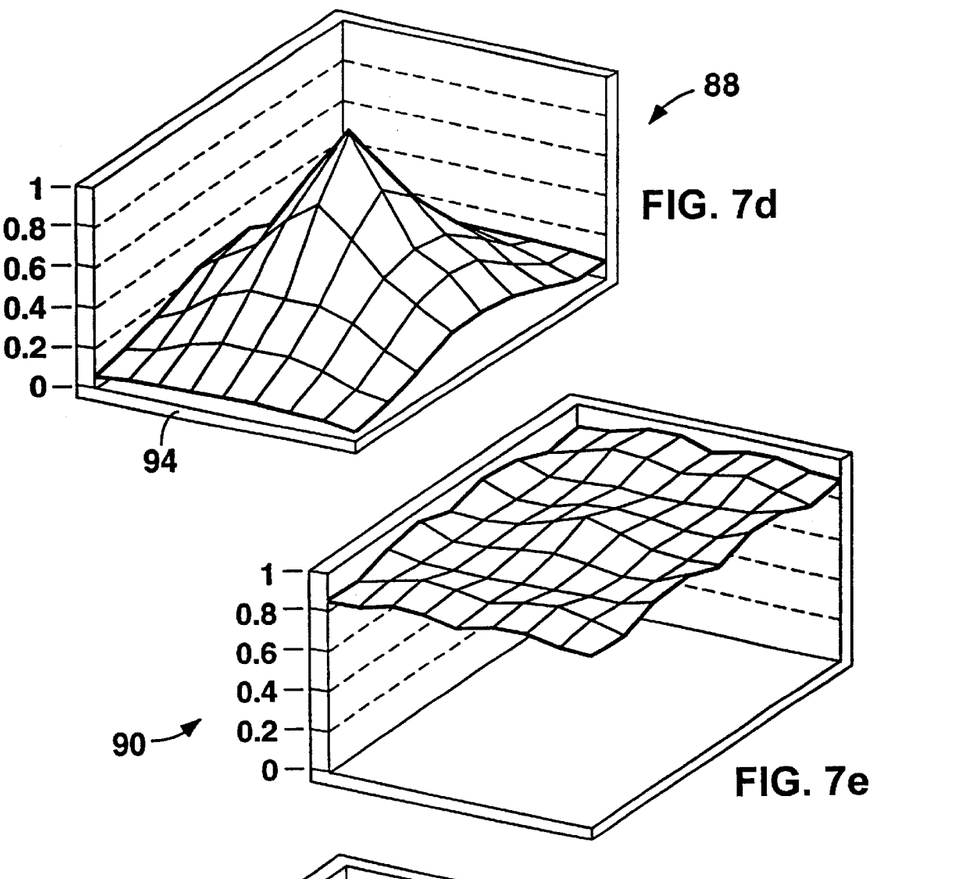

The light power distribution on the entrance window of the tunnel, view 88, the tunnel exit window, view 90, and on the LCD panel, view 92, are shown in FIG. 7D, FIG. 7E and FIG. 7B. The respective integration factors corresponding to the three views are 7.1%, 93% and 70% respectively. Note the excellent integration at the tunnel exit. The degradation of the integration factor from the tunnel exit window to the LCD panel is due to vignetting of the relay lenses. The vignetting can be overcome by using a larger relay. However, in the instant case this is not done since an of integration factor of 70% produces excellent system performance.

EXAMPLE 2
Folded System for Illuminating an LCD Panel

The optical system shown in FIG. 7C, is identical to that in example 1 except that the light source has been moved and a prism added to effectively fold the optical path, thereby saving linear space and providing the option of removing undesired infrared and ultraviolet energy from the system.

The right angle prism is joined to the entrance end of the light tunnel. The prism cross sectional area and that of the tunnel entrance are essentially equal. The prism may be made of an inexpensive optical glass such as BK71, noted above. The prism surfaces 94 and 96 have a standard anti-reflective coating, with a reflection factor of about 1.5%. Prism surface 98 has a special selective coating (termed a "cold mirror") to reflect the visible light wavelengths, a range of about 0.4 to 0.7 microns, and to transmit infrared or heat wavelengths which are above about 0.7 microns and ultraviolet wavelengths which are below about 0.4 microns.

The power from the OSRAM source is focused on prism area 94. Rays such as a $r_1$ have a single reflection from the area 98 and thus enter the tunnel the same angle with respect to the optical axis 100 as before the prism. Rays such as a $r_2$, reflect from area 98 and undergo total internal reflection from area 94, which is a glass air interface. The rays reflected from area 94 then enter the tunnel with the same angle with respect to the optical axis as before the prism. Rays such a $r_3$ are reflected as shown in FIG. 7c, and enter the tunnel at an angle with respect to the optical axis equal to that before the prism. Rays $r_1$, $r_2$ and $r_3$ are reflected into the tunnel with essentially no power loss. That is, the prism acts to change the direction of the light bundle by 90° without changing the angular aperture of the bundle and with minimal power loss. Infrared and ultraviolet light pass through area 98 and are thereby removed from the system. Thus this portion of the arc emitted energy is prevented from damaging the optical elements or the light valve.

EXAMPLE 3
A Three Valve Illumination System

Figure 8A:
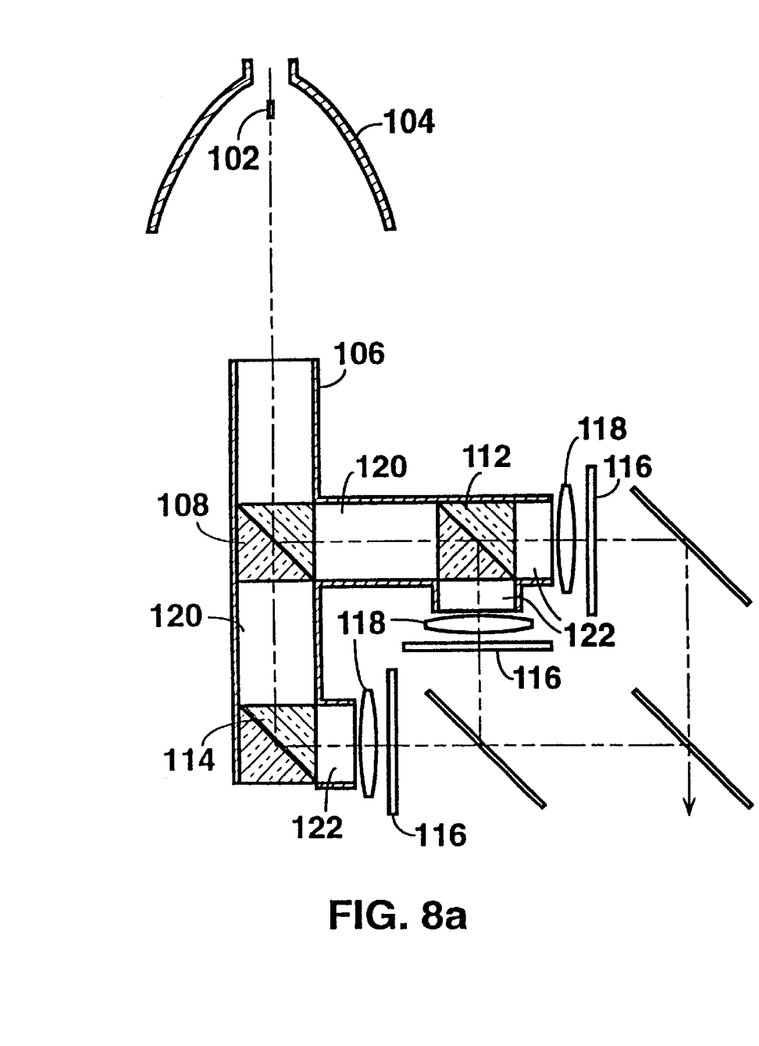
FIG. 8a is a top view of an illumination system including a light source, a light reflector and a compound light tunnel having dichroic prisms at junction points.

A system for uniformly illuminating three LCD panels, each panel having surface dimensions 26.24 mm×19.68 mm, may be constructed as shown in FIG. 8A.

Carbon arc source 102 has an arc dimension of 4 mm located at the focus of ellipsoidal mirror 104. Mirror 104 is a front surface cold mirror, as described above, so that the heat energy from the arc source is largely precluded from entering the first tunnel entrance. Of the total energy emitted by the arc, about 35% is focused on the entrance plane of tunnel 106 at an angular aperture of 10°. The tunnel entrance is located 158 mm from the mirror vertex. Tunnel 106 is a right parallelepiped having front surface mirror interior walls and inside dimensions 28.2 mm×21.7 mm×50 mm. Each tunnel section shown in FIG. 8A had the same cross section dimensions, 28.2 mm×21.7 mm. Tunnels 120 each have a length of 41.7 mm and tunnels 122 each have a length 12 mm.

Compound cube prism 108, located at the exit end of tunnel 106, has a dichroic coating on diagonal surface 110 to transmit a range of wavelengths and reflect a different range of wavelengths, as described above in the discussion of FIG. 6a. The compound cube prism was constructed by cementing together the diagonal surfaces of two right angle prisms with a dichroic coating included therebetween. The function of the remaining tunnel sections in FIG. 8A is as described above in the discussion of FIG. 6a. Prism 112 is constructed and functions analogously to prism 108. Prism 114 has only a reflective coating on the exterior diagonal surface.

Light exiting from each tunnel 122 is passed through field lens 118 and thereby imaged onto the active area of LCD panels 116, each panel having surface dimensions 26.24 mm×19.68 mm. Note that the aspect ratio of the tunnel segments is essentially equal to the aspect ratio of the LCD panels. Three dichroic mirrors (not shown) are used to relay the exit light beams onto the entrance pupil of a projection lens (not shown). Field lenses 118 are of well known design and are chosen to collect an emerging light beam having an angular aperture of 10°.

Omitting losses in the dichroic prisms, the transmission factor of this compound tunnel with the silver mirror walls inside is about 99%. The compound tunnel improved the integration factor from 7%, at the entrance window, to 60% on the LCD panels.

EXAMPLE 4
Comparison Example for Example 3.

Figure 8B:
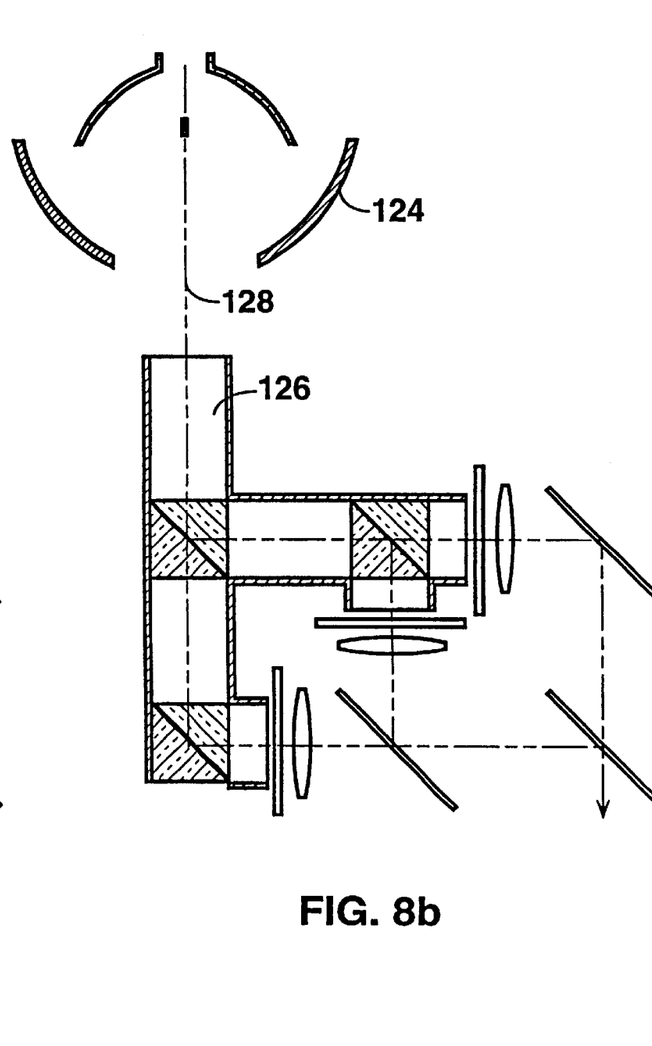
FIG. 8b is similar to FIG. 8a except that a more efficient light reflector is used in conjunction with the source.

The modifications of the apparatus of example 3, are shown in FIG. 8B. The three significant changes are:

1) Instead of the single mirror reflector at the source a compound (two mirror) reflector, 124, is used. This reflector design results in a space saving (linear distance from lamp base to tunnel entrance 107.2 mm as compared to 158 mm in example 3) and gives a collection efficiency 54% (compare 35%) with an angular aperture 16°, the light being focused into tunnel 126, having an area dimension 23 mm×16.4 mm.

2) Tunnel 126 is linearly tapered from 23.0 mm×16.4 mm at the entrance end to 28.2 mm×21.7 mm at the exit end. This translates to a taper of 3°, relative to optical axis 128, for each tunnel wall. The taper serves to reduce the angular aperture of the light beam from 16°, at the entrance end, to 10° at the respective exit ends. Of the total light energy entering tunnel 126 at an angular aperture of 16°, 83% exits the tunnel system at an angular aperture of 10°, assuming the transmission factor of the dichroic elements is 100%. The transmission efficiency of the tunnel describes the efficiency of light transformation from spatial angular aperture 23.0 mm×16.4 mm×16° to 28.2 mm×21.7×10°.

The combination of the compound reflector and the tapered tunnel give a relative increase of the collection efficiency of about 25% compared to the system shown in FIG. 8A.

3) The position of the LCD panels and field lenses are reversed. (Compare FIG. 8A to FIG. 8B.).

The placement of the field lens behind the LCD provides a significant improvement of the image contrast because this configuration maintains the angular aperture at 10° for light incident on the LCD active surface. By comparison, positioning the field lens in front of the LCD panel gives an angular aperture of ±10° degrees for on-axis points and +5 to −15° for off-axis points, e.g., points at a corner of the active area. Contrast produced by the LCD depends on this aperture angle, so that the system of FIG. 8B gave a better projected image than the system of FIG. 8A. It may be noted that placement of the field lens after the LCD panel required that the projection lens be designed to compensate for field curvature aberration from the field lens.

Although specific embodiments of my invention have hereinbefore been disclosed and described, it will be understood that the scope of my invention is nevertheless to be defined by the following claims.

I claim:

1. A mirror assembly for collecting light from a source and directing the light onto a target comprising:

a truncated ellipsoidal mirror, having an reflective concave surface, a near and a far focal point and a circular edge which results from the truncation;

a first annular paraboloid mirror, having a focus point, a reflective concave surface and having respective circular edges of larger and a smaller circular diameter, the smaller diameter circular edge of said annular paraboloid mirror joined to the circular edge of said ellipsoidal mirror; and, a second annular paraboloid mirror, having a focus point, a reflective concave surface and a larger and a smaller diameter circular edge, the larger circular edge of said second annular paraboloid mirror joined to the larger circular edge of said first annular paraboloid mirror, so that the reflective surface of said second paraboloid mirror faces the reflective surface of said ellipsoidal mirror;

wherein the near focal point of said ellipsoidal mirror and the respective focus points of said first and second annular paraboloid mirrors are essentially coincident and are essentially coincident with the geometric center of the light source.

2. The mirror assembly of claim 1 further including an annular spherical mirror, having a center of curvature and a reflective concave surface, spaced apart from, facing and symmetrically disposed about the smaller diameter circular edge of said second annular paraboloid mirror, wherein the center of curvature is coincident with the geometric center of the light source.

3. The mirror assembly of claim 2 wherein the respective circular openings of said second annular paraboloid mirror and said annular spherical mirror are chosen to allow passage of light reflected from said ellipsoidal mirror.

* * * * *